United States Patent [19]

Hillerich

[11] Patent Number: 4,606,632

[45] Date of Patent: * Aug. 19, 1986

[54] METHOD OF MEASURING IMPULSE DURATIONS, ERROR LOCATIONS AND ATTENUATION (OR ABSORPTION) ON CABLES AND LIGHTWAVE CONDUCTORS

[75] Inventor: Bernd Hillerich, Ulm, Fed. Rep. of Germany

[73] Assignee: Philips Kommunikations Industrie AG, Fed. Rep. of Germany

[*] Notice: The portion of the term of this patent subsequent to Jul. 2, 2002 has been disclaimed.

[21] Appl. No.: 682,142

[22] Filed: Jan. 24, 1985

Related U.S. Application Data

[62] Division of Ser. No. 356,479, Mar. 9, 1982, Pat. No. 4,527,113.

[30] Foreign Application Priority Data

Apr. 15, 1981 [DE] Fed. Rep. of Germany ....... 3115200

[51] Int. Cl.⁴ ............................................ G01N 21/88
[52] U.S. Cl. .................................... 356/73.1; 324/52; 324/58.5 B; 179/175.3 F
[58] Field of Search ........................................ 356/73.1

[56] References Cited

U.S. PATENT DOCUMENTS 3,853,005 12/1974 Schendel .................... 324/58.5 B X

FOREIGN PATENT DOCUMENTS

| 974060 | 11/1964 | United Kingdom | 324/52 |
| 2033078 | 3/1980 | United Kingdom | 356/73.1 |
| 2042165 | 8/1980 | United Kingdom | 356/73.1 |

Primary Examiner—Vincent P. McGraw
Attorney, Agent, or Firm—Wigman & Cohen

[57] ABSTRACT

The invention relates to a method for measuring impulse periods, faults locations and attenuations in cables and light wave conductors. The object is to provide a particularly simple method which can be realized with little expense. The solution basically consists in the fact that each measuring impulse releases a saw-tooth generator, that the time value of the voltage delivered from the saw-tooth generator is compared with an adjustable direct current voltage and serves to open a gate circuit at specific times, that the reflected impulse is compared by a second comparator with a second direct current voltage and that the thus separated signals are led to the gate circuit and displayed by an indicator. The invention will primarily be used in locating faults in light wave conductors under difficult conditions on the construction site.

7 Claims, 2 Drawing Figures

METHOD OF MEASURING IMPULSE DURATIONS, ERROR LOCATIONS AND ATTENUATION (OR ABSORPTION) ON CABLES AND LIGHTWAVE CONDUCTORS

This is a division of application Ser. No. 356,479, filed Mar. 9, 1982, now U.S. Pat. No. 4,527,113.

BACKGROUND OF THE INVENTION

The invention relates to a method for measuring impulse periods and fault locations in cables and light wave conductors, having a generator for voltage impulses or light impulses which are then fed into the measured object and having a directional coupler which conducts the impulses reflected back from the test specimen to a detector.

Such methods are primarily performed with reflectometers, whereby an oscilloscope display is generally necessary to evaluate the measurement. Particularly for fault location in light wave conductors in accordance with the backscattering process, expensive electronic equipment is necessary in order to be able to recognize the desired signals on the display screen. Sample-and-hold circuits or similar integration methods are usually used in this situation.

An optical time-range reflectometer is known for determining the attenuation of light conducting fibers, which consists of a light source, a beam divider, a detector, an amplifier, a signal processor and a display device as well as associated control units. In this known reflectometer the signal processor consists of a sample and hold circuit, by means of which the backscatter signal released periodically by an impulse carrier is scanned (DE-OS No. 28 37 981 ).

The backscatter signals displayed on the screen of this type of reflectometer can be evaluated in four ways and permit conclusions to be drawn with regard to a series of characteristics of the measured light wave conductor. In many instances, particularly in seeking faults, a small portion of the presented information is sufficient.

SUMMARY AND OBJECTS OF THE INVENTION

The object of the invention is to provide a method by means of which the fault location in a cable or in a light wave conductor can be determined with sufficient precision and with the lowest possible expense without the use of a cathode ray tube.

This object is achieved according to the invention by means of a saw-tooth generator which generates a saw-tooth voltage in which the time value of the voltage delivered is compared with a defined, adjustable first direct current voltage by means of a comparator; that this comparison serves to produce an impulse, the timing of which is determined by the first direct current voltage; that the output voltage of the detector is compared with a defined, adjustable second direct current voltage by means of a second comparator; that this second comparison is used to separate the reflected signals which exceed the established second voltage; and that the time-coincidence of these separated signals with the impulses whose timing is established by the first direct current voltage is determined in a gate circuit and displayed by means of an indicator.

The advantages achieved with the invention consist particularly of the fact that common commercial, sturdy components can be used to perform the method, that a cathode ray tube and the high voltage supply necessary therefor can be avoided, and that a measuring device operating according to the invention can be used even by semi-skilled workers under the rough conditions of a construction site and in searching for faults in the field.

In one embodiment, the determination of the first direct current voltage is performed by a first voltmeter, whose display is calibrated in range values. In a further embodiment, the range display of the voltmeter is calibrated by a change in the sensitivity of the voltmeter corresponding to the impulse speed in the measured object determined by other means.

This embodiment of the invention is particularly advantageous when a digital measuring device is used as the voltmeter, the sensitivity of which can be set without steps and without problems by the input of digitalized data.

In a further embodiment, the range display of the voltmeter is calibrated by a change in the amplitude of the saw-tooth voltage of the saw-tooth generator corresponding to the impulse speed in the measured object determined by other means.

This embodiment has the advantage that it offers a particularly economical option for the construction of such a measuring device.

Furthermore, it is novel to provide the definition of the second direct current voltage by means of a second voltmeter, the display of which is calibrated in attenuation values.

This embodiment makes use of a further advantage of the method according to the invention; that without significant additional expense, an attenuation measurement can be performed with the same device, without it being necessary that the remote cable end is accessible.

BRIEF DESCRIPTION OF THE DRAWINGS

Exemplary embodiments of the invention are illustrated in the drawing and are described below in greater detail. Shown are.

DETAILED DESCRIPTION OF A PREFERRED EMBODIMENT

Figure 1:
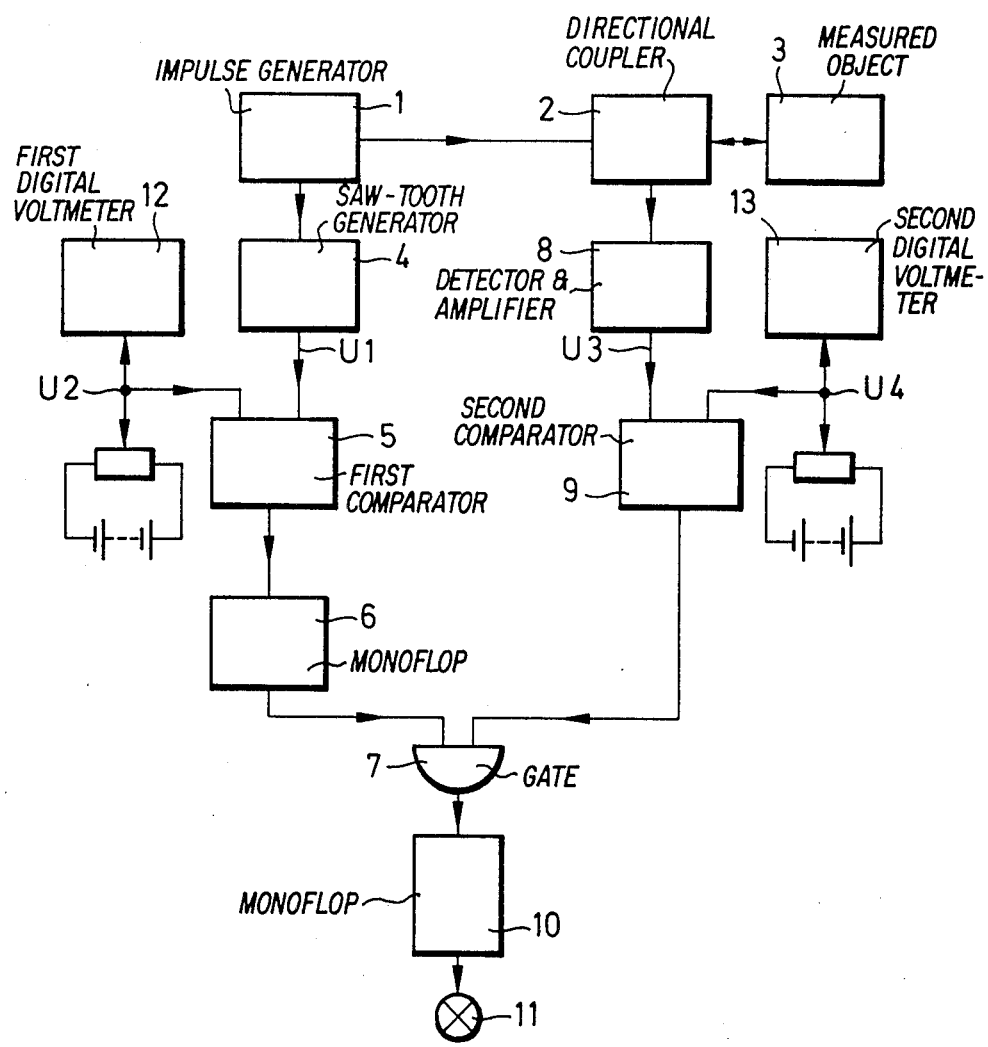
FIG. 1—the block circuit diagram of a device for performing the method
Figure 2:
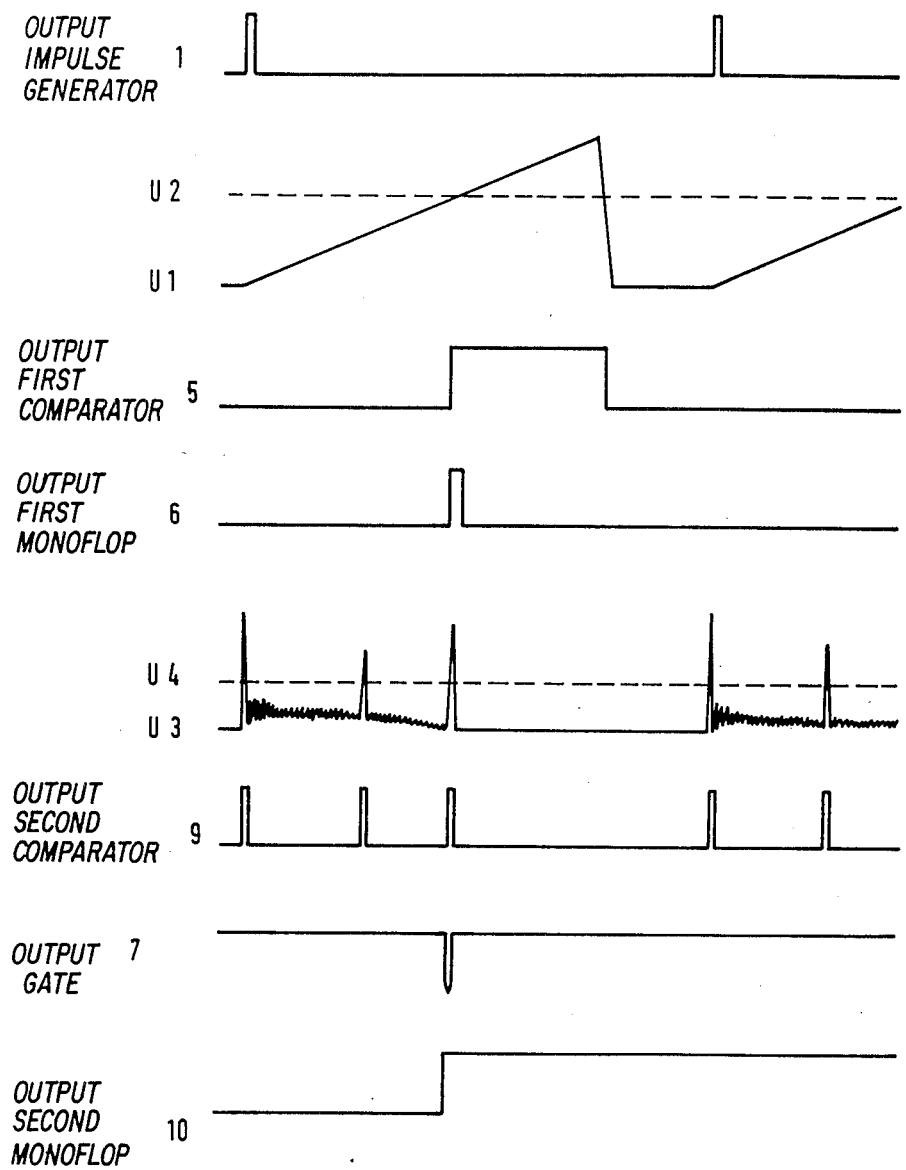
FIG. 2—the associated impulse diagram.

The steps of the method become clear from examining the block circuit diagram in FIG. 1 together with the impulse diagram in FIG. 2 associated therewith. Both Figures will therefore be discussed together. The impulse generator 1 produces impulses, the curve of which is illustrated in the first line. For fault location in a light wave conductor, these are light impulses which are produced, for example, by a laser. They are conducted to the object 3 to be measured by means of a directional coupler 2. In this instance the directional coupler 2 consists of a beam divider, preferably made of a light conductor branch. Each impulse of the impulse generator 1 starts the saw-tooth generator 4, the output voltage U1 of which is illustrated in the second line. The time value of the saw-tooth voltage U1 is compared with an adjustable direct current voltage U2 in the first comparator 5. When the saw-tooth voltage U1 reaches the value of the direct current voltage U2, which is also shown in the second line as a broken line, the first comparator 5 generates an output and starts the first monoflop 6, which gives an established impulse to the gate circuit 7. The light impulse reflected back from the measured object 3 passes through the directional coupler 2 to the detector 8, such as a photodiode with a subsequently connected amplifier, the output voltage U3 of which is illustrated in the fifth line. This output voltage U3 is compared in the second comparatator 9 with an adjustable second direct current voltage U4, which is also shown in the fifth line as a broken line. If an impulse exceeding the direct current voltage 4 reaches the gate circuit 7 at the same time said gate has been opened by the output of the first monoflop, the second monoflop 10 starts and produces a display on the indicator 11, which can consist, for example, of an LED. One can thus see that the opening time of the gate circuit 7 can be shifted by changing the direct current voltage 2 over the entire period of time between 2 impulses of the generator 1. In the impulse diagram in FIG. 2 the gate circuit 7 is open at a point in time at which an especially strong impulse is reflected back from the measured object 3, such as is typical, for example, for the end of a light wave conductor. A further impulse at the output of the detector 8 indicates a fault at about ⅔ of the length of the light wave conductor. It can be displayed by reducing the direct current voltage U2 on the indicator 11. It may further be seen that the level of the direct current voltage U2 represents a measurement for the impulse duration and thus for the fault location. The value of this direct current voltage U2, in the simplest case, can be determined by a calibrated voltage divider. For increased precision in fault location, however, it is recommended to measure the value of the voltage U2 by a voltmeter 12, the scale of which is calibrated in range values. For adaptation to different impulse speeds, such as can appear in light wave conductors the sensitivity of the voltmeter 12 can be varied continuously, which is not difficult with the use of a digital voltmeter. It may also be seen from the impulse diagram in FIG. 2, however, that such an adaptation to the impulse speed in the measured object 3 can also be accomplished by the steepness of the slope of the saw-tooth voltage U1.

It may also be seen, particularly from the impulse curve in FIG. 2, that the amplitude of the currently illustrated reflected impulse can be determined by changing the second direct current voltage U4. In this simplest case, this can occur because this second direct current voltage U4 is picked up by a calibrated voltage divider. The preciseness of this additional method for measuring attenuation can be significantly improved when the value of the second direct current voltage U4 is measured by a second digital voltmeter 13, the display of which is then effectively calibrated in attenuation values. In this manner it is possible to perform backscatter measurements and to follow the attenuation pattern over the entire length of the measured object 3. Furthermore, it is possible to make the fault location automatic with the described method, in that a saw-tooth generator is used as a voltage source for the comparison voltage U2, the voltage rise of which is stopped by a connection with the output of the second comparator 9 at the moment that a reflected impulse appears there. The associated range value can then also be read on the voltmeter 12.

I claim:

1. A method for measuring fault locations in a light wave conductor and light pulse transit time to and from the fault being measured, including a generator for generating light impulses which are fed into the light wave conductor through a directional coupler which also separates the impulses reflected back from the light wave conductor to a detector, and a saw-tooth generator for generating a saw-tooth signal upon the receipt of each impulse from said generator, comprising the steps of:

comparing the amplitude of said saw-tooth signal to a predetermined adjustable first direct current voltage and generating a first impulse signal when said amplitude exceeds said first direct current voltage;

comparing the output voltage from said detector to a predetermined adjustable second direct current voltage and generating a second impulse signal when the output voltage of said detector exceeds said second direct current voltage;

detecting the time coincidence of said first and second impulse signals and producing a third impulse signal when said first and second impulse signals coincide in time; and displaying said time coincidence of said first and second impulse signals, whereby said time coincidence corresponds to the light pulse transit time and the fault location of said light wave conductor.

2. Method according to claim 1, wherein the definition of the first direct current voltage (12) is performed by a first voltmeter (12), the display of which is calibrated in range values.

3. Method according to claim 2, wherein the range display of the voltmeter is calibrated by a change in the sensitivity of the voltmeter corresponding to the impulse speed in the light wave conductor, which is determined by independent means.

4. Method according to claim 2, wherein the range display of the voltmeter is calibrated by a change in the amplitude of the saw-tooth voltage of the saw-tooth generator corresponding to the impulse speed in the light wave conductor, which is determined by independent means.

5. Method according to claim 1, wherein the definition of the second direct current voltage is performed by a second voltmeter, the display of which is calibrated in attenuation values.

6. Method according to claim 5, further comprising the step of adjusting the first direct current voltage to measure range to a fault.

7. Method according to claim 5, further comprising the step of adjusting the second direct current voltage to measure attenuation.

* * * * *